March 28, 1950        J. L. KRIST        2,502,225
MACHINE FOR IMPALING TOBACCO ON LATHS
Filed June 26, 1948        3 Sheets-Sheet 1
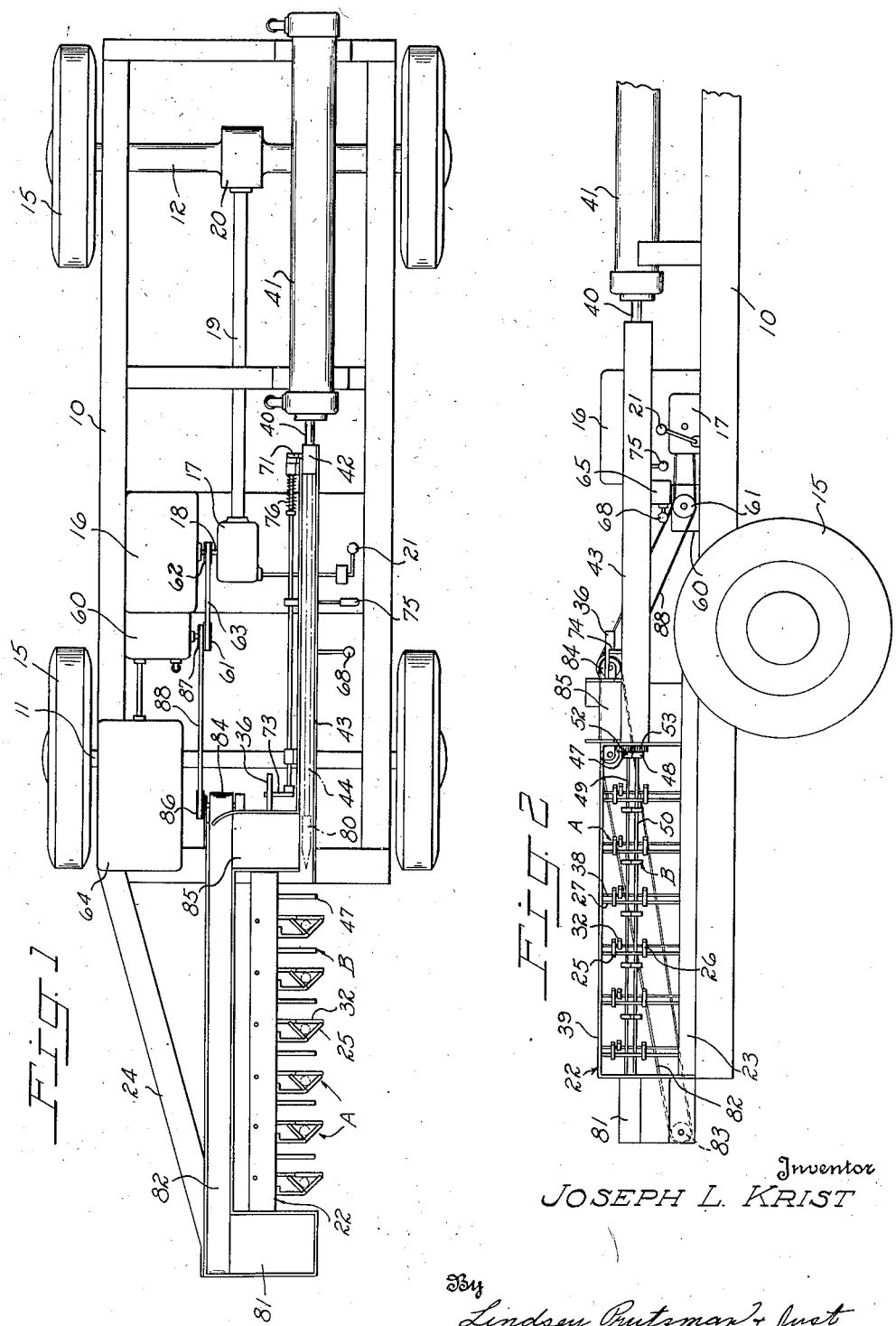
Inventor
JOSEPH L. KRIST
By
Lindsey, Prutzman & Just
Attorneys

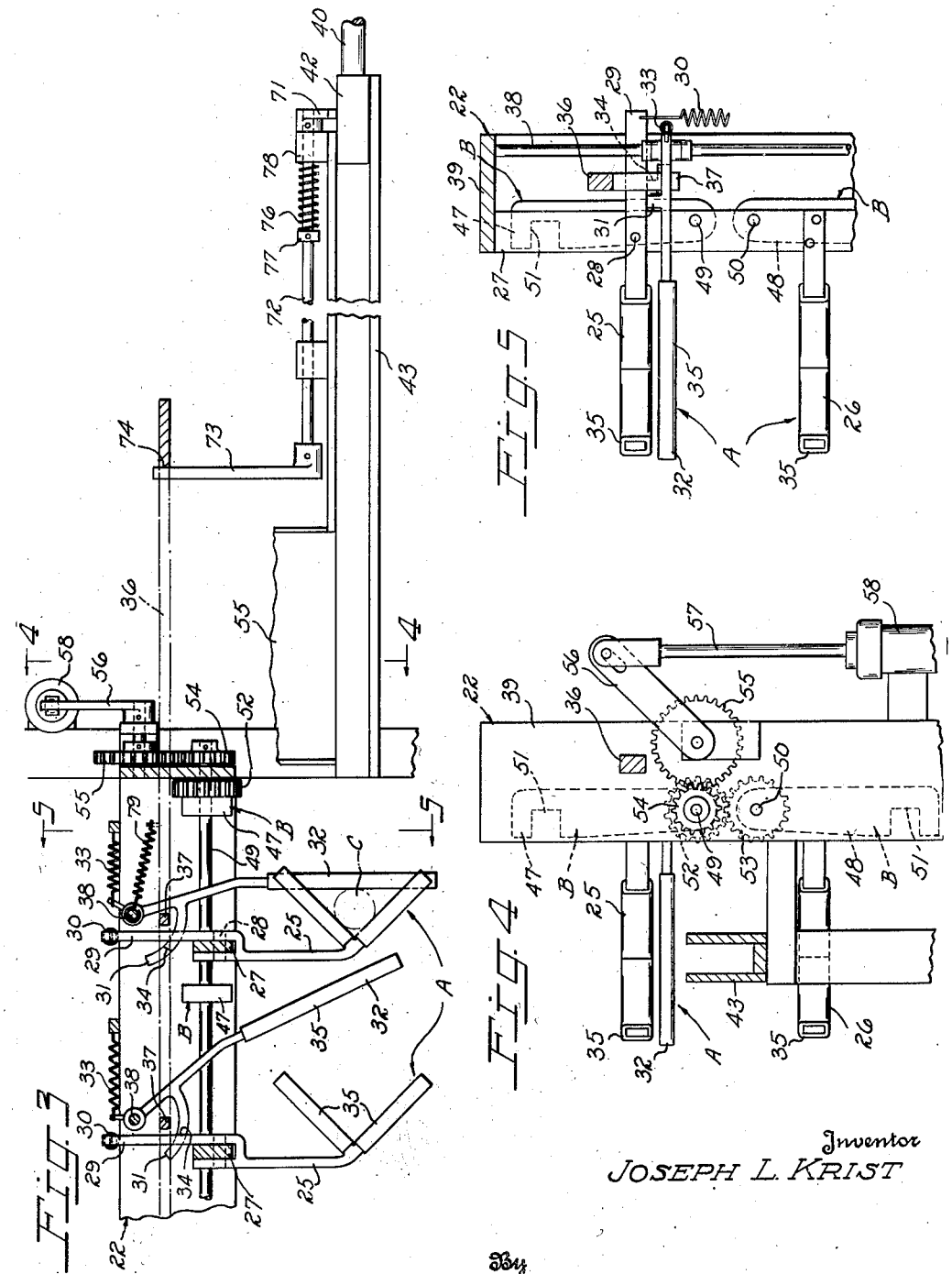

March 28, 1950  J. L. KRIST  2,502,225
MACHINE FOR IMPALING TOBACCO ON LATHS
Filed June 26, 1948  3 Sheets-Sheet 3
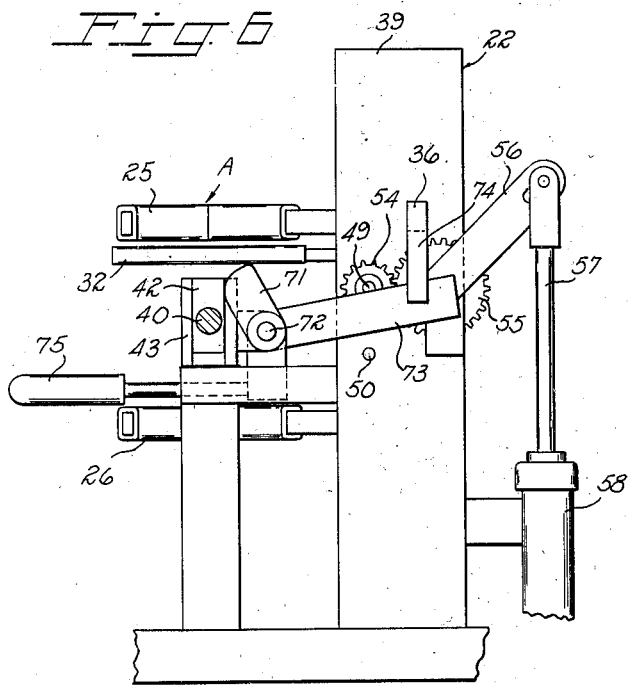
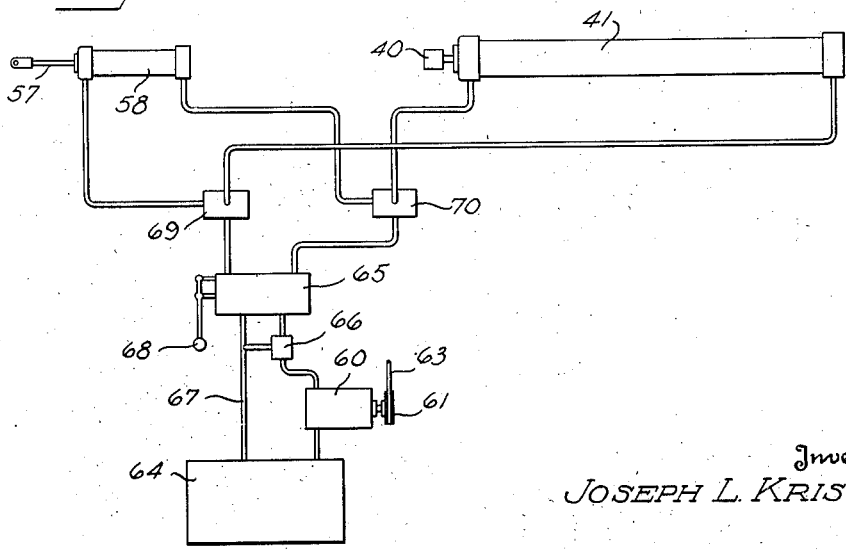
Inventor
JOSEPH L. KRIST
By
Lindsey, Prutzman & Just
Attorneys Patented Mar. 28, 1950

2,502,225

UNITED STATES PATENT OFFICE 2,502,225

MACHINE FOR IMPALING TOBACCO ON LATHS

Joseph L. Krist, Broad Brook, Conn.

Application June 26, 1948, Serial No. 35,356

15 Claims. (Cl. 214—5.5)

The present invention relates generally to tobacco impaling mechanism, and more particularly to a machine for automatically suspending tobacco plants from laths whereby the harvesting and curing of tobacco is facilitated.

In the harvesting and curing of tobacco, it is conventional to suspend the plants by their stalks or stems from laths in spaced relationship to each other, following which the laths are hung in barns or the like for a curing period. The impaling and spacing of the tobacco plants on the laths has generally been carried out heretofore entirely as a manual operation and, while a number of machines for this purpose have been devised, none of them, to the best of my knowledge, has ever been successful commercially.

It is a principal object of my invention to provide a machine for impaling tobacco plants on laths which is practical from a commercial standpoint so that it may be used successfully on tobacco farms to lower the cost of producing tobacco and to increase production.

Included in the above object is the aim of providing a machine which will eliminate the skilled labor heretofore regarded as necessary to carry out the harvesting of tobacco, which skilled labor is increasingly difficult to obtain and which is a major item of cost in the preparation of tobacco.

A further aim included in the above object is to provide a machine which will reduce manual operations to a minimum so that a lesser number of persons is required to harvest a given tobacco crop and yet which permits the harvesting to be carried out in less time. It also is desired to provide a machine which can be operated by persons of average skill following a minimum period of instruction and practice.

Another aim is to provide a machine which is effective for impaling the tobacco plants on laths in an improved manner or at least as well as when the operation is carried out manually, which will insure that the lath is properly and accurately run through the stem of the plant so that the plant is firmly impaled and so that there will not result any material damage to the plant any more than would be expected from normal manual handling, and whereby the desired spacing of the tobacco on the lath is accurately carried out.

A further aim is to provide a machine which is foolproof in operation and reliable in performance so that it may be used continuously to impale and space the tobacco plants on laths in the desired manner without breakdowns or interruptions for repair and adjustment over long periods of operation.

A further aim is to provide a machine which will operate at a high rate of speed so as to permit a greatly accelerated harvesting rate such that a greater amount of tobacco may be harvested during the sometimes brief periods during which harvesting conditions are optimum.

Another aim is to provide a machine of this character which is of simple design and may be manufactured from readily obtainable or fabricated parts so that the machine may be provided at a reasonable cost.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings—

Figure 1 is a plan view of a complete machine embodying the present invention;

Fig. 2 is a fragmentary, front elevation thereof;

Fig. 3 is an enlarged, fragmentary, cross sectional view showing details of the tobacco holding mechanism;

Fig. 4 is a cross sectional view taken along the line 4—4 of Fig. 3;

Fig. 5 is a cross sectional view taken along the line 5—5 of Fig. 3;

Fig. 6 is a fragmentary, enlarged end view of the machine; and

Fig. 7 is a diagrammatic view of the operating mechanism.

Referring to the drawings, the device of the present invention is shown for convenience as mounted upon a chassis 10 which is supported on a front axle 11 and rear axle 12 having wheels 15 fixed thereto. By reason of such mobile mounting of the device, the use of the machine in the field is facilitated but it will be readily understood that the type of mounting is not critical and any other form of support, preferably mobile, could be utilized.

Supported on the chassis 10 is a motor 16 which may be of any desired type and, therefore, is shown only diagrammatically, which motor is utilized for supplying the power to operate the mechanism as well as for propelling the machine. For this latter purpose, there is shown a transmission 17 directly connected to the motor through shaft 18 and a propeller shaft 19 extending rearwardly from the transmission to the differential 20 of the rear axle 12. A clutch mechanism (not shown) operable by the lever 21 may be provided to engage and disengage the transmission as desired.

The chassis 10 is provided with a forwardly extending overhanging section 22, including frame members 23 and 24, on which is mounted the tobacco plant positioning means to be described hereinafter. The advantages of utilizing such an overhanging section is that the approach to the machine by the workers is thereby unobstructed, which facilitates the convenience and speed at which the machine may be operated.

As best shown in Figs. 1 and 2, there are a series of aligned tobacco positioning assemblies A (shown six) supported on the section 22. Each of the assemblies A includes an upper V-shaped member 25 and a lower V-shaped member 26, the members being at different levels and substantially parallel with the apexes thereof vertically aligned. The lower V-shaped members 26 are fixed on supporting posts 27 as best shown in Fig. 5 of the drawings. Each of the members 25, however, is pivotally supported on the vertical posts 27 by means of pivot pins 28 extending therethrough. By reason of such mounting of the members A, it is possible to pivot the member 25 in a vertical plane.

An extension 29 on each of the members 25, as best shown in Figs. 3 and 5, extends rearwardly of the frame where it is engaged by a spring 30. This spring 30 tends to pivot the member 25 in a clockwise direction as viewed in Fig. 5. Movement of the member 25 in this direction, however, is limited by the abutment of extension 29 against an arcuate extension 31 on the associated auxiliary holding member 32, each of which members 32 is pivotally mounted on a rod 38 for pivoting movement in a horizontal plane toward and away from the V-shaped portions 25 and 26. Rods 38 as well as posts 27 are supported at the bottom on the frame member 23 and at the top by the housing 39. A spring 33 urges the holding member 32 toward the V-shaped members 25 and 26 which is the normal plant engaging position. The arcuate extension 31 of the member 32 is provided with a notch 34 whereby, when the member 32 is pivoted a sufficient distance away from the V-shaped portions 25 and 26, the extension 29 of the member 25 will engage in such notch and latch the member 32 in open position. However, when the member 25 is pivoted such that the V-shaped portion is moved downwardly, the extension 29 is removed from the notch 34 whereupon the holding member 32 is released and permitted to move to plant-engaging position. These two respective positions are best shown in Fig. 3 of the drawings.

The foregoing mechanism is utilized for positioning the tobacco plants in alignment and properly spaced for the projection of a conventional lath therethrough. As will be apparent from the foregoing description, it is necessary for the operator merely to place the stem or stalk of the tobacco plant within the V-shaped portions 25 and 26 with the leaves of the plant hanging downwardly and then, merely by exerting a slight downward pressure on the member 25, the holding member 32 is unlatched and moves to plant-engaging position. The resulting three-point engagement of the tobacco plant is best shown in Fig. 3 with the stalk of a tobacco plant which has been inserted into the device being shown in dot and dash lines at C.

The extremities of the V-shaped members 25 and 26 and holding member 32 are each covered with a sponge rubber sheathing 35 which, it has been found, permits the use of a sufficient pressure to insure positive positioning of the tobacco plants without, at the same time, causing any damage to the plants. The resulting pressure on the plants is very similar to that exerted by the human hand.

Prior to the plant positioning opeartion, to reset the auxiliary holding members 32 a draw bar 36 having projections 37 engaging the members 32 is drawn to the right (as viewed in Fig. 3) which causes the holding members 32 to be moved to the open position shown in Fig. 3 with the members 32 latched into said open position by the engagement of the extensions 29 with the notches 34. The persons harvesting the tobacco may then place the tobacco plants in the positioning assemblies A and in substantially the same motion unlatch the holding members 32 by downward pressure on the members 25 whereupon the plants are firmly and accurately positioned in alignment and in proper spaced relationship for the insertion of a lath therethrough.

In order to propel a lath through the positioned tobacco plants, there is provided power means which, in the specific example, comprises a plunger 40 hydraulically operated by the cylinder 41. This plunger 40 is positioned on the chassis 10 in alignment in a vertical plane with the apexes of the members 25 and 26 and at a height approximately midway therebetween. A guideway 43 is provided on the chassis 10 in front of the plunger 40 for receiving a conventional lath 44 (shown in dot and dash lines). The alignment of the guideway 43 is such that, when a lath 44 is positioned therein and the plunger 40 is actuated, the lath will be propelled between the upper and lower V-shaped members 25 and 26 of the positioning assemblies A and in alignment with their apexes. The vertical spacing of the members 25 and 26 is such as to allow free passage of a conventional sized lath therebetween after allowing for the space occupied by the auxiliary holding member 32, the latter being arranged to project just below the member 25.

In order to cause the lath 44 to maintain such aligned position during its impaling movement, there is provided a series of guide members B positioned alternately with the positioning assemblies A so as to provide a continuing guide means throughout the full extent thereof. Each of the guide members B comprises a pair of cooperating arms 47 and 48, the arms 47 being affixed to a longitudinal shaft 49 and the lower arms 48 being affixed to a second longitudinal shaft 50. The guide members B are best shown in detail in Figs. 4 and 5 and it will be seen that each of the arms 47 and 48 includes a notch 51, these notches being arranged to cooperate when the arms 47 and 48 are pivoted to guiding position, as shown in Fig. 1, to form an opening just sufficient to receive the lath 44.

The shafts 49 and 50 are interconnected through gears 52 and 53 whereby they may be pivoted simultaneously. The shaft 49 has an additional gear 54 affixed thereto which is in mesh with a second gear 55 adapted to be rotated by the crank 56. In the specific embodiment shown, the crank 56 is arranged to be actuated by a piston rod 57 which, in turn, is actuated by a hydraulic cylinder 58. As will be apparent, when the piston rod 57 is thrust outwardly from the cylinder 85, it will operate the crank 56 to turn the gear 55 in a counterclockwise direction, as viewed in Fig. 4 of the drawings, which will cause the arms 47 and 48 to move to the open position shown in Figs. 4 and 5. Conversely, when the piston rod 57 is moved in the opposite direction, the arms 47 and 48 are moved to the closed guiding position shown in Figs. 1 and 2 of the drawings.

In the specific embodiment shown, the cylinders 58 and 41 are adapted to be supplied with fluid under pressure by a pump 60 which is driven through pulleys 61 and 62 and connecting belt 63 by the motor 16. The pump 60 communicates at its inlet with a fluid reservoir 64 and its outlet communicates with a four-way valve 65. A pressure release valve 66 is positioned intermediate the pump and the valve 65 so that any excess fluid may be bypassed to the reservoir return conduit 67.

The four-way valve 65 is adapted to be actuated by an operating handle 68 which, when the same is turned to one position, will cause the outlet of the pump to be connected to a distributing valve 69 and will cause the return conduit 67 to be connected with a second distributing valve 70. The admission of fluid under pressure to the distributing valve 69 will admit fluid to the front of the cylinder 58 so as to retract the piston rod 57 and thereafter will admit fluid under pressure to the rear of cylinder 41 so as to move the plunger 40 outwardly. The valve 67 is constructed and arranged so that the operation is sequential, that is, the fluid is admitted to the cylinder 58 first and, when retraction of the piston rod 57 is completed, then the fluid is admitted to the cylinder 41.

When the operating handle 68 is moved to the reverse position, the outlet of the pump 60 is connected to the distributing valve 70 while the distributing valve 69 is connected to the return conduit 67. The distributing valve 70, in turn, admits fluid to the rear of cylinder 58 and to the front of cylinder 41. As in the case of valve 69, the valve 70 is designed to operate sequentially so that the piston rod 57 is actuated before the plunger 40.

As will be apparent from the above description, when the operating handle 68 is moved to the first position described, the connecting rod 57 is actuated to close the guide members B following which the plunger 40 is actuated to drive the lath through the tobacco plants positioned in the members A. Subsequently, when the operating handle 68 is moved to the reverse position, the guide members B are opened and then the plunger 40 is retracted. If desired, the movement of the operating handle 68 to reverse position can be carried out automatically upon the completion of the spearing operation, this being a mere matter of design. It might be mentioned here that the construction and design of the specific valve mechanisms, pump and cylinders, etc. do not form any part of the present invention and any suitable mechanism for this purpose may be utilized. Accordingly, further description of this particular mechanism is not deemed to be necessary and the same has been shown merely diagrammatically in the drawings.

Upon the reverse movement of the plunger 40, the head 42 thereof engages an extension 71 at one end of a shaft 72. The other end of shaft 72 has an arm 73 which engages a shoulder 74 on the draw bar 36. Accordingly, when the plunger 40 is retracted, it draws with it the draw bar 36 which causes the holding members 32 to be latched into open positions as previously described. A handle 75 mounted on the shaft 72 may then be turned to disengage the extension 71 from the plunger head 42 causing the shaft 72 to move longitudinally to the left, as viewed in Fig. 3 of the drawings, by reason of the spring 76 which is compressed between a collar 77 on the shaft 72 and the shoulder 78 when the shaft 72 is drawn to the right. This sliding movement of the shaft 72 permits the draw bar 36 to be moved to the position shown in Fig. 3 by reason of springs 79 (shown one) and in which position the projections 37 are out of the way of the movement of the hold members 32.

In the impaling operation, it is, of course, desired to utilize a conventional so-called "needle" 80, but which more descriptively may be referred to as a spearhead, shown in dot and dash lines in Fig. 1. This head fits loosely over the end of the lath and is provided with a sharp point for piercing the stem of the tobacco plant. The guideway 43 is arranged so that, when the spearhead 80 is placed at the front of the guideway and a conventional lath is placed between this spearhead and the plunger 40, the operation of the plunger 40 will cause the lath to enter the spearhead without requiring any manual intervention. When the lath has been driven through the tobacco plants supported in the positioning members A, the spearhead 80 is then knocked off into a chute 81 which delivers the spearhead onto the endless conveyor belt 82. The head will normally fall off due to the weight thereof and its center of balance being in advance of the portion loosely fitting the lath. The belt 82 is supported on rollers 83 and 84 in an inclined manner so that the spearhead is then delivered to a second chute 85 which in turn delivers the spearhead 80 to the original position shown in Fig. 1. At both chutes, the movement of the spearhead is a translating movement so that the pointed end of the spearhead 80 is always in the right direction. In this way, the spearhead 80 may be conveniently used over and over again.

The roller 84 is adapted to be driven by pulleys 86 and 87, the latter being mounted on the pump shaft and the pulleys being connected together by a belt 88.

It thus will be seen that there has been provided in accordance with the invention a complete machine which will automatically accomplish the impaling of tobacco plants on laths in a desired manner. As will be apparent, the machine may be operated at a high rate of speed and, therefore, several persons may be employed to place the plants in the positioning assemblies A and additional help may be provided to remove the loaded laths. In general, it is desired to provide a person who does nothing else than operate the valves and places the laths into feeding position. If desired, for convenience, a suitable seat (not shown) may be provided adjacent the operating handle 68 and handle 75 which also is adjacent the guideway 43. A suitable rack for the automatic or semi-automatic feeding of laths to the operator may also be provided, if desired.

In the operation of a machine as described, it has been found that the positioning of the tobacco plants on the lath is accomplished without injury to the plants and the piercing of the plants together with the proper spacing thereof is entirely accurate and uniform. The machine is efficient and rapid in operation and as a result it is possible to accomplish the harvesting of a larger amount of tobacco with a lesser amount of help and with a saving in time.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a machine for impaling tobacco plants on laths, the combination comprising a line of spaced apart holders for engaging and supporting tobacco plants by the stalk, each of said holders comprising a member having a V-shaped seat and a movable second member cooperating therewith to engage the stalk of a tobacco plant in said seat, guide means intermediate said holders and spaced therefrom, each of which comprises a pair of elements of which at least one is mounted for movement toward and away from the other in a direction laterally to said line of holders, said elements having means forming an enclosure through which a lath may be projected when the elements are positioned together, means for driving a lath through the enclosures formed by said guide elements and through tobacco plant stalks engaged in said holders, and means for separating said guide elements to permit removal of a lath and tobacco plants impaled thereon.

2. In a machine for impaling tobacco plants on laths, a holder for engaging and supporting a tobacco plant by the stalk to permit the insertion of a lath therethrough comprising a pair of substantially parallel spaced-apart V-shaped seats with their apexes in substantially vertical alignment so as to engage one side of the stalk, a cooperating holding arm movable toward and away from said seats for engaging the opposite side of the stalk, means biasing the arm into holding position, and disengageable means for latching the arm into open position.

3. A device as set forth in claim 2 in which said seats and arm are covered with sponge rubber.

4. In a machine for impaling tobacco plants on laths, a holder for engaging and supporting a tobacco plant by the stalk to permit the insertion of a lath therethrough comprising a first V-shaped seat having a fixed position, a second V-shaped seat mounted for pivoting movement, means biasing the second seat into a position parallel to and spaced from the first seat with the apexes of the seats in substantial alignment, a cooperating holding member swingable toward and away from the seats in a plane intermediate the seats, means biasing the cooperating member toward the seats, and means disengageable by pivoting movement of the second seat for latching the cooperating member in a position away from the seats.

5. In a machine for impaling tobacco plants on laths, a holder for engaging and supporting a tobacco plant by the stalk to permit the insertion of a lath therethrough comprising a fixed V-shaped seat mounted in a horizontal plane, a second V-shaped seat mounted for pivoting movement in a vertical plane, means constructed and arranged to yieldingly maintain the second V-shaped seat substantially parallel and spaced from the fixed V-shaped seat with the vertexes of said seats in substantially vertical alignment, a cooperating holding arm mounted for pivoting movement toward and away from the seats in a horizontal plane intermediate said seats, means biasing the arm toward the seats, and an extension on the pivotal seat for latching the arm in open position and adapted to be moved to unlatching position when the seat is pivoted.

6. In a machine for impaling tobacco plants on laths, the combination of a series of aligned holders for engaging and supporting tobacco plants by the stalk to permit the insertion of a lath therethrough, each of said holders comprising a pair of substantially parallel spaced-apart V-shaped seats with their apexes in substantially vertical alignment so as to engage one side of a stalk, a cooperating holding arm movable toward and away from said seats for engaging the opposite side of the stalk, means biasing the arm into holding position, and disengageable means for latching the arm in open position, and common means for moving all of said arms simultaneously to latch position.

7. In a machine for impaling tobacco plants on laths, the combination of a series of aligned holders for engaging and supporting tobacco plants by the stalk to permit the insertion of a lath therethrough, each of said holders comprising a pair of substantially parallel spaced-apart V-shaped seats with their apexes in substantially vertical alignment so as to engage one side of a tobacco stalk, and a cooperating arm pivoted for movement toward and away from said seats for engaging and disengaging the opposite side of the stalk, means biasing said arms toward said seats, individually releasable latching means for holding said arms in disengaging position, and common means for moving all of said arms simultaneously to latch position.

8. In a machine for impaling tobacco plants on laths, the combination of a series of aligned holders for engaging and supporting tobacco plants by the stalk to permit the insertion of a lath therethrough, each of said holders comprising a pair of substantially parallel spaced-apart V-shaped seats with their apexes in substantially vertical alignment so as to engage one side of a tobacco stalk, and a cooperating arm pivoted for movement toward and away from said seats for engaging and disengaging the opposite side of the stalk, means biasing said arms toward said seats, individually releasable latching means for holding said arms in disengaging position, means for simultaneously pivoting said arms to latched disengaging position, reciprocable power means movable in one direction to drive a lath through the tobacco stalks and movable in the opposite direction to actuate said pivoting means.

9. In a machine for impaling tobacco plants on laths including a plurality of holders for supporting tobacco plants vertically by the stalk, a series of aligned lath guides comprising a pair of parallel shafts, a series of arms fixed to one of said shafts in the same radial plane, a second series of arms fixed to the other of said shafts in one radial plane, means for rotating said shafts in opposite directions to move said arms toward and away from each other, and means carried by said arms for laterally positioning a lath intermediate the holders when the arms are moved together.

10. In a machine for impaling tobacco plants on laths including a plurality of holders for supporting tobacco plants vertically by the stalk, a series of aligned lath guides comprising a pair of parallel shafts, a first set of arms fixed to one of said shafts in a single radial plane, a second set of arms fixed to the other of said shafts in a single radial plane, power means for rotating said shafts in opposite directions to move said arms toward and away from each other, said arms having notches adapted to be brought into alignment when the arms are moved together to form a lath receiving opening intermediate said holders, power means for driving a lath through said lath guides, and means for operating said power means in sequence.

11. In a machine for impaling tobacco plants on laths, the combination comprising a series of aligned holders for engaging and supporting tobacco plants by the stalk to permit the insertion of a lath therethrough, each of said holders comprising a pair of substantially parallel spaced-apart V-shaped seats for engaging one side of a tobacco stalk and a cooperating arm movable toward and away from the seats to engage and disengage the opposite side of the stalk, a plurality of lath guides intermediate said holders and in alignment therewith comprising a pair of arms movable between an open position and a closed position for laterally guiding a lath, means for driving a lath through said guides and the stalks engaged by said holders, guide operating means for selectively opening and closing said guides, releasing means for moving said holder arms to disengaging position, and control means for causing said guide operating means to close the guides and for causing said lath driving means to drive the lath in sequence and after the completion of the lath driving operation to cause said guide operating means to open the guides and to cause the releasing means to open the holders whereby the lath and tobacco plants impaled thereon may be removed.

12. In a machine for impaling tobacco plants on laths, the combination comprising a series of aligned holders for engaging and supporting tobacco plants by the stalk to permit the insertion of a lath therethrough, said holders comprising substantially parallel spaced-apart V-shaped seats with their apexes in substantially vertical alignment, cooperating arms individually pivotal toward and away from the seats to engage and disengage the plants therebetween, and individually releasable means for latching the arms in disengaging position, a plurality of lath guides intermediate said holders and aligned therewith, said guides being constructed and arranged to be closed for guiding the lath and opened to release the lath, first power means for driving a lath through said guides and the tobacco stalks engaged in said holders, second power means for opening and closing the guides, and means for operating said power means in sequence.

13. In a machine for impaling tobacco plants on laths, the combination comprising a series of aligned holders for engaging and supporting tobacco plants by the stalk, said holders comprising substantially parallel spaced-apart V-shaped seats with their apexes in substantially vertical alignment, cooperating arms individually pivotal toward and away from the seats to engage and disengage tobacco plants therebetween, and individually releasable means for latching the arms in disengaging position, a plurality of lath guides intermediate said holders and aligned therewith, said guides comprising a first shaft, a set of arms affixed to said shaft, a second shaft parallel to the first, a second set of arms affixed to the second shaft, means for rotating the shafts in opposite directions to move the arms toward and away from each other, said arms having cooperating notches forming a guide opening for a lath when the arms are moved together, means for simultaneously pivoting all of the said holder arms to open latched position following an impaling operation, means for driving a lath through said guides and the tobacco stalks engaged in said holders, and power means for causing the shaft rotating means to move the guide arms to closed position, then for causing the lath driving means to drive the lath, and then for causing the shaft rotating means to move the guide arms to open position in sequence.

14. In a machine for impaling tobacco plants on laths having a series of aligned holders for engaging and supporting tobacco plants by the stalk to permit the passage of a lath therethrough, the combination therewith of a guideway adjacent one end of said series of holders for receiving a spearhead and a lath in alignment with the tobacco stalks in said holders, an endless belt mounted on rollers adjacent the ends of said series of holders, a chute for delivering a spearhead to the endless belt at the end of the series of holders opposite from said guideway, and a chute for delivering a spearhead from the belt to the guideway.

15. In a machine for impaling tobacco plants on laths having a series of aligned holders for engaging and supporting tobacco plants by the stalk to permit the insertion of a lath therethrough, the combination therewith of a guideway in alignment with said series of holders for receiving a spearhead and a lath, power means for driving the lath and spearhead from said guideway through the plant stalks, a chute at the opposite end of said series of holders for receiving the spearhead, an endless belt mounted rearwardly of said holders arranged to receive the spearhead from the said chute and return the spearhead to an elevated position above the said guideway, and a second chute for receiving the spearhead from the belt and returning it to said guideway.

JOSEPH L. KRIST.

REFERENCES CITED

The following references are of record in the file of this patent:

UNITED STATES PATENTS

| Number | Name | Date |
|---|---|---|
| 708,434 | Wells | Sept. 2, 1902 |
| 881,573 | Graf et al. | Mar. 10, 1908 |
| 918,075 | Muggli | Apr. 13, 1909 |
| 945,717 | Gullickson | Jan. 4, 1910 |
| 971,580 | Wells | Oct. 4, 1910 |
| 1,530,939 | Hawks | Mar. 24, 1925 |